United States Patent [19]
Lundblad et al.

[11] Patent Number: 5,420,922
[45] Date of Patent: May 30, 1995

[54] SYSTEM FOR THE SAFE TRANSMISSION OF MESSAGES

[75] Inventors: Leif Lundblad; Claes Björkman, both of Stockholm; Lars Eklund, Knivsta, all of Sweden

[73] Assignee: Nybo Seal System AB, Stockholm, Sweden

[21] Appl. No.: 198,210

[22] Filed: Feb. 17, 1994

Related U.S. Application Data

[63] Continuation of Ser. No. 969,040, Oct. 30, 1992, abandoned.

[30] Foreign Application Priority Data

Nov. 7, 1991 [SE] Sweden ............................... 9103284

[51] Int. Cl.[6] ......................... H04N 1/44; H04L 9/00; G03G 21/00
[52] U.S. Cl. ..................................... 380/1.8; 355/201; 380/21; 380/25
[58] Field of Search .................... 380/18, 25, 21; 355/201

[56] References Cited

U.S. PATENT DOCUMENTS

| | | |
|---|---|---|
| 3,439,469 | 4/1969 | Van Mil . |
| 3,465,492 | 9/1969 | Jensen . |
| 3,752,904 | 8/1973 | Waterbury . |
| 3,849,968 | 11/1974 | Tateisi . |
| 3,973,373 | 8/1976 | Williams, Jr. et al. . |
| 4,202,150 | 5/1980 | Petersson . |
| 4,701,233 | 10/1987 | Beck et al. . |
| 4,739,377 | 4/1988 | Allen ........................... 355/133 |
| 5,031,379 | 7/1991 | Lundblad et al. . |
| 5,099,335 | 3/1992 | Kato . |
| 5,157,726 | 10/1992 | Merkle et al. ................ 380/23 |
| 5,166,977 | 11/1992 | Ross .............................. 380/18 |
| 5,311,595 | 5/1994 | Bjerrum et al. ............... 380/25 |

FOREIGN PATENT DOCUMENTS

| | | |
|---|---|---|
| 406198 | 1/1991 | European Pat. Off. . |
| 0438930 | 7/1991 | European Pat. Off. . |
| 58-215864 | 12/1983 | Japan . |
| 464215 | 3/1991 | Sweden . |
| 2217949 | 11/1989 | United Kingdom . |
| WO8602799 | 5/1986 | WIPO . |
| WO8605344 | 9/1986 | WIPO . |

OTHER PUBLICATIONS

"Telefax mit integrierter Verschlusselung" Ascom Technische Mitteilungen, No. 2, 1991, Bern, Switzerland.

*Primary Examiner*—Stephen C. Buczinski
*Attorney, Agent, or Firm*—Simmons, Perrine, Albright & Ellwood

[57] ABSTRACT

A system for safe transmission of a message with positive identification of the sender includes on the transmitter side telefax-type message-transmitting apparatus (10) and encryption means (22) for encrypting transmission signals from the telefax apparatus prior to transmission, and includes on the receiver side decryption means (25) for decrypting incoming signals prior to their receipt in telefax-type apparatus (20), and message enveloping and message gathering means (21) for safe storage of messages received by the telefax apparatus (20) in an enveloped form within a closed casing (11). Activating means (23) on the transmitter side includes a card reader (231) and keyboard (232) and is intended to activate the encryption means (22) in response to signals from the card reader (231) and the keyboard (232). Control means (24) on the receiver side function are adapted to activate the decryption means (25) in response to signals emanating from the card reader (231) and the keyboard (232). The control means (24) causes a marking to be applied to the top of each printed sheet commenced in the telefax apparatus (20) on the receiver side, this marking disclosing whether the transmitted message is an encrypted message or a clear language message.

9 Claims, 2 Drawing Sheets

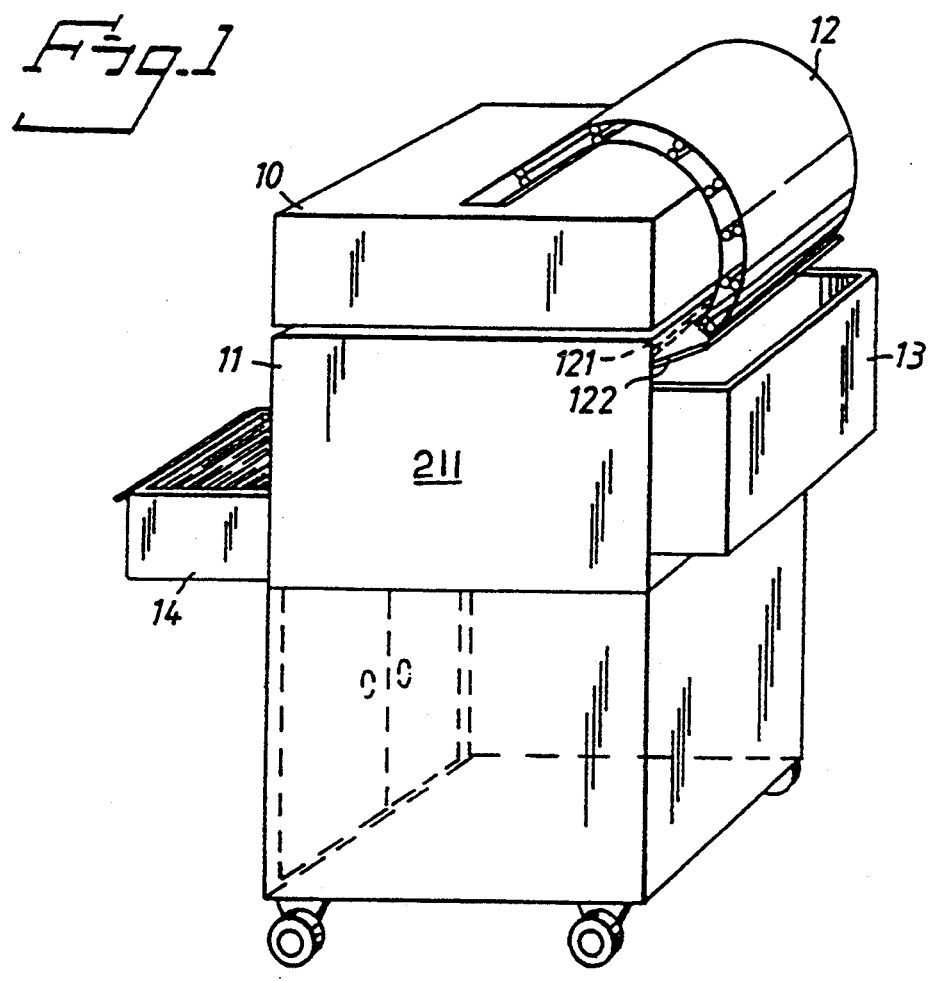

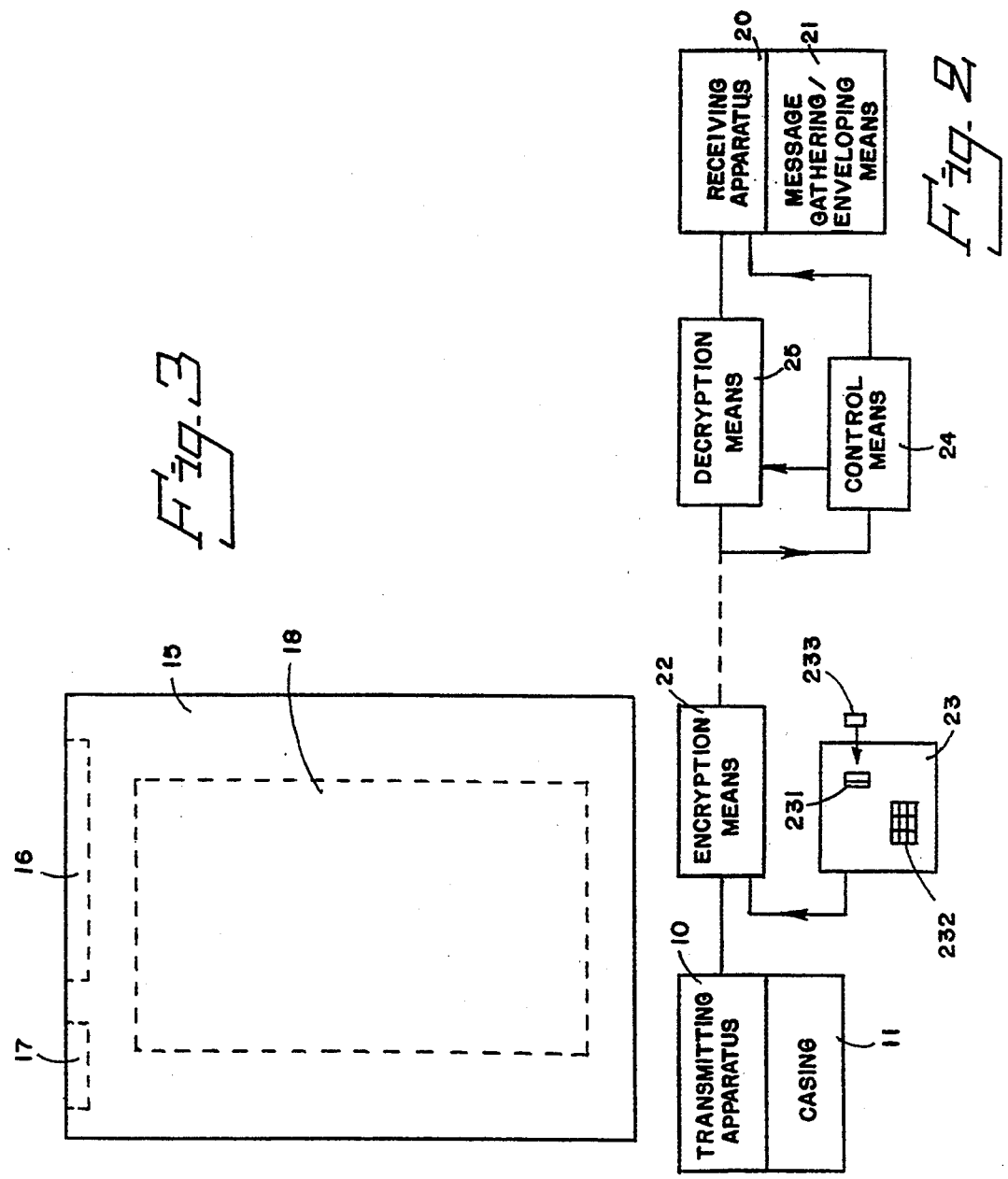

SYSTEM FOR THE SAFE TRANSMISSION OF MESSAGES

This is a continuation of application Ser. No. 07/969,040, filed on Oct. 30, 1992, now abandoned.

BACKGROUND OF THE INVENTION

1. Field of the Invention

The present invention relates to a system for the safe transmission of messages from sender to receiver and with positive identification of the sender.

The system is of the kind which includes on the transmitter side: a telefax-type message transmitter; and an encryption device for encrypting the telefax transmission signals prior to transmission; and on the receiver side: a decryption device for decrypting incoming signals prior to their reception in a telefax-type message receiving apparatus; and a message enveloping and message bundling arrangement for safe storage of messages received by the receiving telefax apparatus in an enveloped form within a closed casing.

2. Description of the Related Art

It is previously known to transmit messages between sender and receiver with the aid of apparatus, e.g., of the telefacsimile type, either over physical transmission lines or by cordless transmission. Message transmission is effected by inserting into the telefax apparatus on the sender or transmitter side a sheet of paper which bears the messages to be transmitted, this message being converted to signal form by the transmitting telefax apparatus. These signals are transmitted to the receiver side, where the signals are received and converted to printed text on a further sheet of paper, by the receiving telefax apparatus. In its widest meaning, the word "text", as used here, shall be understood to consist not only of words but also of characters, signs of all different kinds, picture material, etc.

It is also known to encrypt the text prior to transmission so as to safeguard the text against "listening" (tapping) of the messages during their route from the transmitter to the receiver, so that the messages cannot be read by unauthorized persons. The messages must then be decrypted back to their original text form on the receiver side, so that the recipient is able to understand the message.

When sending messages by means of telefacsimile apparatus, which are generally available to a large number of people in a working place for instance, there is a risk of transmitted and printed message being distributed or spread in an uncontrolled fashion, which in some cases may be disadvantageous with regard to technical, business/technical or political relationships. For the purpose of eliminating this risk, it is known from U.S. Pat. No. 5,031,379 to use a message enveloping and message gathering arrangement for safe storage of messages received by the telefax apparatus, in an enveloped form within a closed casing connected to the telefax apparatus.

Areas are found in which a greater degree of safety, or security, against "listening" to message transmissions is required than the degree of safety provided by the technique exemplified above. As is known, a signature found on examples of agreements that are transmitted via telefax apparatus do not constitute a valid signature in legal terms. Another area which requires a greater degree of safety, or security, when transmitting message is found within banking systems, for instance. In order to be valid, it is necessary that the person transmitting an order relating to money transaction (concerning cash, shares, etc.) can be sure that the transmission is not listened to (tapped), and also that the receiver can be certain:

1. that listening or eavesdropping has not taken place;
2. that an unauthorized person cannot have availed himself to the order on the receiver side; and
3. that the sender is actually the person stated on the order.

The object of the present invention is to provide a system which will enable messages to be transmitted with the degree of security that is required in the aforementioned extreme cases.

SUMMARY OF THE INVENTION

An inventive system of the aforedescribed kind has on the transmitter side an activating means which comprises card readers and keyboard intended for activation of the encryption device in response to signals from the card reader and keyboard, and has on the receiver side a control device which is intended to activate the decryption means in response to signals emanating from signals from the card reader and the keyboard. The system is activated with cards of the so-called "smart card" type, for instance. These and other characteristic features of an inventive system will be apparent from the following Claims.

BRIEF DESCRIPTION OF THE DRAWING

The invention will now be described in more detail with reference to the accompanying schematic drawing, in which FIG. 1 illustrates a telefacsimile machine equipped with a message enveloping and message gathering arrangement; and FIG. 2 illustrates a system which includes transmitting and receiving telefax apparatus, encryption/decryption means and activation and control means; and FIG. 3 illustrates a sheet of paper (15) showing "language marking" (16), number marking (17) and message text (18) areas.

DESCRIPTION OF PREFERRED EMBODIMENTS

FIG. 1 illustrates a telefax apparatus 10 provided with signal-receiving means and a printing mechanism for printing received messages on sheets of paper taken from a paper sheet store. The paper sheets that have passed through the printing mechanism are gathered and bundled together in a closed casing 11 as they leave the printer, and the arrangement also includes a store of enveloping material with which the bundled sheets are enveloped. Mounted at the bottom of the closed casing 11 is a lockable drawer 14 in which enveloped bundles of messages are collected and from which drawer said messages may be removed by authorized persons.

Located between the apparatus 10 and the casing 11 is a transporter 12 provided with switch means which when located in a first position 121 permits the passage of messages, receipts, etc., to an open collecting box 13, and which when located in a second position 122 guide the printed sheets into the casing 11 and to a message bundling and enveloping means. The switch means 121-122 is moved between said first and second positions in response to a separate signal (code) delivered by a transmitting device in conjunction with transmitting the message to the receiving station.

The system illustrated in FIG. 2 includes on the transmitter side: a message transmitting apparatus 10 of the telefacsimile type; an encryption means 22 which encrypts the telefacsimile output signals from apparatus 10 prior to transmission; and an activation means 23 which includes a card reader 231 and a keyboard 232 and which is intended to activate the encryption means 22 in response to signals from the card reader 231 and the keyboard 232; and on the receiver side: a decryption means 25 for decrypting incoming signals; a message-receiving apparatus 20 of the telefacsimile kind; a message-enveloping and message gathering means 21 for safe or secure storage of messages received by the telefax apparatus 20, in an enveloped form within a closed casing 211; and a control means 24 which is intended to activate the decryption means 25 in response to signals emanating from the signals from the card reader 231 and the keyboard 232.

It will be understood that, in practice, a system must also be able to function both to transmit message and to receive messages on one and the same side, and consequently the two telefax apparatuses 10, 20 both function to transmit and to receive messages, and the means 22, 25 function to encrypt and to decrypt messages.

The system is also able to transmit and to receive non-coded or non-crypted messages, without needing to be modified. Naturally, encrypting means are not used in this mode of operation. In this regard, it is convenient for the receiving equipment to mark the top of each printed sheet 15 commenced with a so-called "clear language marking" 16, for instance with the words "not encrypted".

A person who wishes to transmit a message which requires a high degree of security against unauthorized listening or forgery places the typed, printed or written message in its intended place in the telefacsimile apparatus 10, inserts his card 233 (smart card) in the card reader 231, inserts his PIN-code through the keyboard 232 and dials the receiver's number (possibly card number) on the keyboard of the apparatus and presses the START button. Provided that the person's number hidden in the card 233 coincides with the inserted PIN-code, the telefax apparatus 10 will now transmit to the receiver side signals that have been encrypted by the encryption device 22.

In response to signals emanating from the signals from the card reader 231 and the keyboard 232, the control means 24 on the receiver side activates the decryption means 25 and causes a separate encryption marking 16 to be applied to the top of each printed sheet 15 commenced in the telefax apparatus 20 for the decrypted message text. More specifically, this separate encryption marking 16 is applied at the highest point on the printed paper where *transmitted message* cannot be written by the receiving apparatus. This eliminates the risk of a person manipulating a non-encrypted message in order to give the impression that the message has been encrypted during transmission.

Furthermore, the control means 24 causes number markings 17 to be applied in response to signals from the card reader 231 on the transmitter side on each printed sheet 15 commenced in the telefax apparatus 20 for the decrypted message text 18. This enables an authorized receiver, who is assumed to have knowledge of the card numbers of the persons concerned (not similar to the PIN-code) to assure himself that the incoming message was truly transmitted by the sender.

Consequently, it is no longer necessary for, e.g., a bank to contact a customer in order to confirm that an instruction (order) sent to the bank is fully in order.

Many variations are conceivable within the scope of the inventive concept. For example, the whole of a message can be stored in a memory in the telefax apparatus prior to the person transmitting the massage activating the encryption process with the aid of his card and his PIN-code. This constitutes a further security measure against unauthorized influence of a transmission sequence.

Another modification is one in which the decryption means 25 is caused to detect the occurrence of an encrypted text and therewith cause the separate encryption mark 16 to be applied on the receiver side.

We claim:

1. A system for safe transmission of a message by a sender to a recipient, comprising:
   (a) transmitting apparatus adapted to transmit the message as outgoing first signals; said transmitting apparatus including encryption means for selectively encrypting said first signals;
   (b) receiving apparatus adapted to receive said first signals such that the message is printed on sheet(s) of paper contained in said receiving apparatus; said receiving apparatus including decryption means for selectively decrypting said first signals;
   (c) control means for selective activation of said decryption means in response to receipt of second signals; and
   (d) activating means, including:
      (1) a "smart" card,
      (2) a card reader adapted to read said "smart" card, and
      (3) a keyboard;
   (e) wherein insertion of said "smart" card only in said card reader of said transmitting apparatus and selective keying only of said keyboard of said transmitting apparatus are adapted to selectively and cooperatively:
      (1) activate said encryption means, and
      (2) cause said transmitting apparatus to transmit said second signals to said control means.

2. The system according to claim 1, wherein said activating means is activated by insertion of said "smart" cart into said card reader by the sender and by entry of a personal identification number (PIN) into said keyboard by the sender.

3. The system according to claim 1, wherein:
   (a) said "smart" card contains a card number; and
   (b) said encryption means and said decryption means are activated by entry of a personal identification number (PIN), associated with said card number, into said keyboard by the sender.

4. The system according to claim 3, wherein said card number is printed on said sheet(s) printed with the message.

5. The system according to claim 3, wherein said card number is printed on said sheet(s) that is printed with a message that was encrypted during transmission of the message.

6. The system according to claim 5, wherein a marking is printed on said sheet(s) printed with the message, said marking indicating that the message was encrypted during transmission thereof.

7. The system according to claim 1, wherein a marking is printed on said sheet(s) printed with the message, said marking indicating that the message was encrypted during transmission thereof.

8. The system according to claim 1, wherein a marking is printed on said sheet(s) printed with the message, said marking indicating that the message was not encrypted during transmission thereof.

9. The system according to claim 1, including a closed casing having enveloping and gathering means such that said sheet(s) printed with the message which is selectively directed into said closed casing is gathered and enveloped.

* * * * *